(12) United States Patent
Brok et al.

(10) Patent No.: US 8,765,086 B2
(45) Date of Patent: Jul. 1, 2014

(54) PROCESS FOR REMOVAL OF HYDROGEN SULPHIDE AND CARBON DIOXIDE FROM AN ACID GAS STREAM

(75) Inventors: Theodorus Johannes Brok, Amsterdam (NL); Gerardus Petrus Van Der Zwet, Amsterdam (NL)

(73) Assignee: Shell Oil Company, Houston, TX (US)

( * ) Notice: Subject to any disclaimer, the term of this patent is extended or adjusted under 35 U.S.C. 154(b) by 355 days.

(21) Appl. No.: 12/675,241

(22) PCT Filed: Aug. 29, 2008

(86) PCT No.: PCT/EP2008/061355
§ 371 (c)(1),
(2), (4) Date: Aug. 24, 2010

(87) PCT Pub. No.: WO2009/027491
PCT Pub. Date: Mar. 5, 2009

(65) Prior Publication Data
US 2010/0310439 A1    Dec. 9, 2010

(30) Foreign Application Priority Data
Aug. 30, 2007   (EP) .................................. 07115264

(51) Int. Cl.
*B01D 53/48* (2006.01)
*B01D 53/50* (2006.01)
*B01D 53/52* (2006.01)
*B01D 53/62* (2006.01)
*B01D 53/78* (2006.01)

(52) U.S. Cl.
USPC ............ 423/220; 423/226; 423/228; 423/229; 423/242.1; 423/242.2; 423/242.4; 423/242.7

(58) Field of Classification Search
None
See application file for complete search history.

(56) References Cited

U.S. PATENT DOCUMENTS

| | | | |
|---|---|---|---|
| 4,153,674 A | 5/1979 | Verloop et al. | ............ 423/573 R |
| 4,336,233 A * | 6/1982 | Appl et al. | .................... 423/228 |
| 5,137,702 A * | 8/1992 | Yan | ................. 423/229 |
| 6,337,059 B1 | 1/2002 | Schubert et al. | |
| 6,342,091 B1 * | 1/2002 | Menzel et al. | ................... 95/167 |
| 6,517,801 B2 | 2/2003 | Watson et al. | |
| 6,962,680 B1 | 11/2005 | Ishigaki et al. | .......... 423/244.09 |
| 7,056,482 B2 | 6/2006 | Hakka et al. | |
| 7,083,662 B2 * | 8/2006 | Xu et al. | ......................... 95/165 |
| 2004/0253159 A1 | 12/2004 | Hakka et al. | |

FOREIGN PATENT DOCUMENTS

| | | | | |
|---|---|---|---|---|
| CN | 1835786 | 5/2002 | | |
| CN | 1349427 | 9/2006 | | |
| DE | 4321542 | 9/1994 | ............. | B01D 53/04 |
| EP | 733396 | 9/1996 | ............. | B01D 53/14 |
| EP | 798032 | 10/1997 | ............. | B01D 53/52 |
| EP | 1142628 | 10/2001 | ............. | B01D 53/52 |
| EP | 1186334 | 3/2002 | ............. | B01D 53/14 |
| JP | 8290904 | 11/1996 | | |
| JP | 06527153 | 11/2006 | | |
| WO | WO2007/019632 | * | 2/2007 | ............. B01D 53/14 |

OTHER PUBLICATIONS

"Kyoto Protocol to the United Nations Framework Convention on Climate Change." United Nations, 1998.*

* cited by examiner

*Primary Examiner* — Stuart Hendrickson
*Assistant Examiner* — Daniel Berns

(57) ABSTRACT

A process for removal of $H_2S$ and $CO_2$ from an acid gas stream comprising $H_2S$ and $CO_2$, the process comprising the steps of: (a) reacting $H_2S$ in the acid gas stream with $SO_2$ to form sulphur vapor and water vapor, thereby obtaining a first off-gas stream comprising $CO_2$, water vapor, sulphur vapor, residual $SO_2$ and residual $H_2S$; (b) converting residual $SO_2$ in the first off-gas stream to $H_2S$ in a first off-gas treating reactor, thereby obtaining a second off-gas stream depleted in $SO_2$ and enriched in $H_2S$ and $CO_2$ compared to the first off-gas stream; (c) contacting the second off-gas stream with an $H_2S$ absorbing liquid, thereby transferring $H_2S$ from the gas stream to the $H_2S$ absorbing liquid to obtain $H_2S$ absorbing liquid enriched in $H_2S$ and a third off-gas stream enriched in $CO_2$; (d) removing $CO_2$ from the third off-gas stream by contacting the third off-gas stream with $CO_2$ absorbing liquid in a $CO_2$ absorber, thereby transferring $CO_2$ from the third off-gas stream to the $CO_2$ absorbing liquid to obtain $CO_2$ absorbing liquid enriched in $CO_2$ and purified gas.

20 Claims, No Drawings

PROCESS FOR REMOVAL OF HYDROGEN SULPHIDE AND CARBON DIOXIDE FROM AN ACID GAS STREAM

The present application claims priority from European Patent Application 07115264.9 filed 30 Aug. 2007.

The invention relates to a process for removal of hydrogen sulphide ($H_2S$) and carbon dioxide ($CO_2$) from an acid gas stream.

A process known in the art for removal of $H_2S$ from a gas stream uses the partial oxidation of $H_2S$ to $SO_2$ according to:

$$2H_2S + 3O_2 \rightarrow 2H_2O + 2SO_2 \quad (1)$$

The $SO_2$ formed can be (catalytically) converted to elemental sulphur according to the Claus reaction:

$$2H_2S + SO_2 \rightarrow 2H_2O + 3/n S_n \quad (2)$$

The combination of reactions (1) and (2) is known as the Claus process. The Claus process is frequently employed both in refineries and for the processing of $H_2S$ recovered from natural gas.

The Claus process results in a gas still comprising unreacted $H_2S$ and/or $SO_2$. Increasingly rigorous standards concerning the protection of the environment make simple venting or incineration of the final gas stream an unattractive or impermissible choice. Thus, the Claus tail gas is generally passed to a tail gas clean up unit, which is able to effectively remove $H_2S$ or $SO_2$, notwithstanding their low concentration. A number of commercially available tail gas clean up processes are known in the art. For example, in U.S. Pat. No. 6,962,680 a process is described for removing sulphur compounds from a gas comprising besides $H_2S$ also a substantial amount of carbon dioxide. The gas is separated into a concentrated gas containing $H_2S$ and a residual gas containing carbon dioxide, mercaptans and aromatic compounds. The concentrated gas is transferred to a Claus reaction process in which the $H_2S$ is recovered as elemental sulphur. Off-gas discharged from the Claus reaction is heated and mixed with the residual gas; the resultant mixture is transferred to a hydrogenation reactor where residual sulphur compounds are converted to $H_2S$. Thus-formed $H_2S$ is separated using an absorption-regeneration step. Gas exiting the regeneration step is returned to the Claus reaction. A disadvantage of the process described in U.S. Pat. No. 6,962,680 is that the gas leaving the regeneration tower, which contains besides hydrogen sulphide also a substantial amount of carbon dioxide, is returned to the Claus sulphur recovery unit. This results in dilution of the Claus feed gas and a lower rate of the Claus reaction.

Furthermore, the process described in U.S. Pat. No. 6,962,680 results in a considerable emission of carbon dioxide into the atmosphere from the absorption step. During the last decades there has been a substantial global increase in the amount of $CO_2$ emission to the atmosphere. Following the Kyoto agreement, $CO_2$ emission has to be reduced in order to prevent or counteract unwanted changes in climate.

Thus, there remains a need in the art for a process enabling removal of $H_2S$ and $CO_2$ from an acid gas stream comprising $H_2S$ and $CO_2$, both in considerable amounts, wherein emission of $CO_2$ into the atmosphere is reduced to a minimum.

To this end, the invention provides a process for removal of $H_2S$ and $CO_2$ from an acid gas stream comprising $H_2S$ and $CO_2$, the process comprising the steps of:

(a) reacting $H_2S$ in the acid gas stream with $SO_2$ to form sulphur vapour and water vapour, thereby obtaining a first off-gas stream comprising $CO_2$, water vapour, sulphur vapour, residual $SO_2$ and residual $H_2S$;

(b) converting residual $SO_2$ in the first off-gas stream to $H_2S$ in a first off-gas treating reactor, thereby obtaining a second off-gas stream depleted in $SO_2$ and enriched in $H_2S$ and $CO_2$ compared to the first off-gas stream;

(c) contacting the second off-gas stream with an $H_2S$ absorbing liquid, thereby transferring $H_2S$ from the gas stream to the $H_2S$ absorbing liquid to obtain $H_2S$ absorbing liquid enriched in $H_2S$ and a third off-gas stream enriched in $CO_2$;

(d) removing $CO_2$ from the third off-gas stream by contacting the third off-gas stream with $CO_2$ absorbing liquid in a $CO_2$ absorber, thereby transferring $CO_2$ from the third off-gas stream to the $CO_2$ absorbing liquid to obtain $CO_2$ absorbing liquid enriched in $CO_2$ and purified gas.

The purified gas, having very low concentrations of contaminants, especially $CO_2$, may be vented into the atmosphere in compliance with environmental standards. In addition, $CO_2$ may be recovered from the $CO_2$ absorbing liquid enriched in $CO_2$, optionally pressurised and used for example in enhanced oil recovery.

The process according to the invention is especially suitable for acid gas streams comprising significant amounts of $CO_2$ in addition to $H_2S$, as both compounds are efficiently removed.

Suitably, the acid gas stream comprises in the range of from 5 to 95 vol %, preferably from 40 to 95 vol %, more preferably from 60 to 95 vol % of $H_2S$, based on the total acid gas stream.

Suitably, the acid gas stream comprises at least 1 vol %, preferably at least 5 vol %, more preferably at least 10 vol % of $CO_2$, based on the total acid gas stream. These amounts of $CO_2$ in the acid gas stream will translate into comparable amounts of $CO_2$ in the third off-gas stream.

Preferably, the acid gas stream is obtained from the regeneration step of a gas purification process. A gas purification process is required in order to reduce the concentration of especially $H_2S$ in industrial gases such as refinery gas, natural gas or synthesis gas, and generally involves absorbing $H_2S$ in liquid absorbent, which is subsequently regenerated to give $H_2S$-rich gases.

In step (a), $H_2S$ in the acid gas stream is reacted with $SO_2$ to form sulphur vapour and water vapour, thereby obtaining a first off-gas stream comprising $CO_2$, water vapour, sulphur vapour, residual $SO_2$ and residual $H_2S$.

Suitably, step (a) takes place in a Claus unit. In the Claus unit, part of the $H_2S$ in the acid gas is partially oxidised using oxygen-containing gas (including pure oxygen) to form $SO_2$, followed by reaction of the $SO_2$ formed with the remaining part of the $H_2S$ in the presence of a Claus catalyst, preferably non-promoted spherical activated alumina.

The Claus unit suitably comprises a combustion chamber followed by two or more catalyst beds and two or more condensers. The reaction products are cooled in these condensers and liquid elemental sulphur is recovered. Since the yield of elemental sulphur is not quantitative, a minor amount of unreacted hydrogen sulphide and unreacted sulphur dioxide remains in the off-gases from the Claus unit. The off-gas from the Claus unit, which is the first off-gas stream, therefore still comprises residual $SO_2$ and residual $H_2S$. As the partial oxidation of $H_2S$ to $SO_2$ usually is done with air as oxygen-containing gas, a substantial amount of nitrogen will be present in all gas streams exiting the Claus unit. Thus, the first off-gas stream will also comprise a substantial amount of nitrogen besides the aforementioned components.

In step (b), the first off-gas stream is passed to a first off-gas treating reactor to remove residual $SO_2$. In the first off-gas treating reactor $SO_2$ is reduced to $H_2S$ in a hydrogenation reaction. Further, COS (if present) is converted to $H_2S$.

A preferred off-gas treating reactor is a so-called SCOT reactor, i.e., Shell Claus Off-gas Treating reactor, as for example described in the well-known textbook by Kohl and Riesenfeld, Gas Purification, 3rd ed. Gulf Publishing Co, Houston, 1979.

The temperature in the first off-gas treating reactor is suitably in the range of from 150 to 450° C., preferably from 180 to 250° C. At a temperature above 180° C., the presence of small amounts of elemental sulphur in the form of mist in the reaction off-gas is avoided, as the temperature is now above the dew point of sulphur.

In the first off-gas treating reactor, preferably a Group VI and/or Group VII metal catalyst supported on an inorganic carrier is used. Preferably, the catalyst comprises at least one metal selected from the group consisting of copper, cobalt, chromium, vanadium and molybdenum. The metal is suitably present on the catalyst in the form of its oxide or sulphide. The carrier can be selected from the group consisting of alumina, silica, silica-alumina, titania, zirconia and magnesia.

A second off-gas stream, depleted in $SO_2$ and enriched in $H_2S$ and $CO_2$ compared to the first off-gas stream, is emitted from the first off-gas treating reactor.

Suitably, the second off-gas stream comprises less than 500 ppmv $H_2S$, preferably less than 200 ppmv, more less than 100 ppmv $H_2S$, based on the total second off-gas stream.

It will be understood that the amount of $CO_2$ in the second off-gas stream will depend on the amount of $CO_2$ in the first off-gas stream. Suitably, the amount of $CO_2$ in the second off-gas stream is in the range of 105 to 150% of the amount of $CO_2$ in the first off-gas stream.

In step (c), the second off-gas stream is contacted with an $H_2S$ absorbing liquid, thereby transferring $H_2S$ from the gas stream to the $H_2S$ absorbing liquid to obtain $H_2S$ absorbing liquid enriched in $H_2S$ and a third off-gas stream enriched in $CO_2$.

Prior to being contacted with the $H_2S$ absorbing liquid, the second off-gas stream is suitably cooled, preferably to a temperature in the range of from 6 to 60° C. More preferably, cooling is effected in two steps, the first one being an indirect heat exchange and the second one a direct heat exchange with water.

A preferred $H_2S$ absorbing liquid comprises a chemical solvent and/or a physical solvent, suitably as an aqueous solution.

Suitable chemical solvents are primary, secondary and/or tertiary amines, including sterically hindered amines.

A preferred chemical solvent comprises a secondary or tertiary amine, preferably an amine compound derived from ethanol amine, more especially DIPA, DEA, MMEA (monomethyl-ethanolamine), MDEA (methyldiethanolamine) TEA (triethanolamine), or DEMEA (diethyl-monoethanolamine), preferably DIPA or MDEA. It is believed that these chemical solvents react with acidic compounds such as $H_2S$.

Step (c) is suitably performed in an absorption column, either a packed or a tray column may be used. In order to decrease the co-absorption of $CO_2$, a relatively high gas velocity is applied. It is preferred to use a gas velocity in the range of from 1.0 to 3.0 m/s. It is further preferred to apply an absorption column having less than 20 absorption layers. For example, when using a tray column in step (c), the tray column preferably has less than 20 contacting valve trays. When using a packed column in step (c), the packed column preferably has less than 20 theoretical plates. The use of an absorption zone having between 5 and 15 absorption layers is particularly preferred in step (c).

After passage through the $H_2S$ absorbing liquid in step (c), the unabsorbed part of the second off-gas stream, which now comprises a substantial amount of $CO_2$, is discharged from the $H_2S$ absorption column as a third off-gas stream.

The invention is especially suitable in the event that the third off-gas stream comprises a relatively large amount of $CO_2$, preferably at least 1 vol %, more preferably at least 5 vol %, still more preferably at least 10 vol % and most preferably at least 20 vol % of $CO_2$, based on the total third off-gas stream.

It is an advantage of the process that the amount of sulphur compounds, especially $SO_2$, is very low. This enables the use of standard carbon steel equipment for step (d), whereas for known $CO_2$ removal equipment, for example $CO_2$ removal from flue gases, expensive stainless steel equipment has to be used.

Furthermore, there is no need for a quench column, as the gas has already been quenched in step (c).

In step (d), $CO_2$ is removed from the third off-gas stream by contacting the third off-gas stream with $CO_2$ absorbing liquid in a $CO_2$ absorber, thereby transferring $CO_2$ from the third off-gas stream to the $CO_2$ absorbing liquid to obtain $CO_2$ absorbing liquid enriched in $CO_2$ and purified gas.

Suitably, step (d) takes place at elevated pressure, and at relatively low temperature. Elevated pressure means that the operating pressure of the $CO_2$ absorber is above ambient pressure. Preferably, step (d) takes place at an operating pressure in the range of from 20 to 200 mbarg, more preferably from 50 to 150 mbarg. As the third off-gas stream is already at elevated pressure, the pressure difference between the third off-gas stream pressure and the operating pressure of the $CO_2$ absorber is relatively small. Thus, the third off-gas stream does not need to be pressurised or needs to be pressurised to a lesser extent prior to entering the $CO_2$ absorber. Given the large volume of gas to be pressurised, the use of a smaller pressurising equipment or elimination of the need for pressurizing equipment altogether will result in a considerable cost-saving for the overall process.

The $CO_2$ absorbing liquid may be any absorbing liquid capable of removing $CO_2$ from a gas stream. Such $CO_2$ absorbing liquids may include chemical and physical solvents or combinations of these.

Suitable physical solvents include dimethylether compounds of polyethylene glycol.

Suitable chemical solvents include ammonia and amine compounds.

In one embodiment, the $CO_2$ absorbing liquid comprises one or more amines selected from the group of monethanolamine (MEA), diethanolamine (DEA), diglycolamine (DGA), methyldiethanolamine (MDEA) and triethanolamine (TEA). MEA is an especially preferred amine, due to its ability to absorb a relatively high percentage of $CO_2$ (volume $CO_2$ per volume MEA). Thus, an absorbing liquid comprising MEA is suitable to remove $CO_2$ from third off-gas streams having low concentrations of $CO_2$, typically 3-10 volume % $CO_2$.

In another embodiment, the $CO_2$ absorbing liquid comprises one or more amines selected from the group of methyldiethanolamine (MDEA), triethanolamine (TEA), N,N'-di(hydroxyalkyl)piperazine, N,N,N',N'-tetrakis(hydroxyalkyl)-1,6-hexanediamine and tertiary alkylamine sulfonic acid compounds.

Preferably, the N,N'-di(hydroxyalkyl)piperazine is N,N'-d-(2-hydroxyethyl)piperazine and/or N,N'-di-(3-hydroxypropyl)piperazine.

Preferably, the tetrakis(hydroxyalkyl)-1,6-hexanediamine is N,N,N',N'-tetrakis(2-hydroxyethyl)-1,6-hexanediamine and/or N,N,N',N'-tetrakis(2-hydroxypropyl)-1,6-hexanediamine.

Preferably, the tertiary alkylamine sulfonic compounds are selected from the group of 4-(2-hydroxyethyl)-1-piperazineethanesulfonic acid, 4-(2-hydroxyethyl)-1-piperazinepropanesulfonic acid, 4-(2-hydroxyethyl)piperazine-1-(2-hydroxypropanesulfonic acid) and 1,4-piperazinedi(sulfonic acid).

In an especially preferred embodiment, the $CO_2$ absorbing liquid comprises a combination of amines, the combination being one of more amines selected from the group of monethanolamine (MEA), diethanolamine (DEA), diglycolamine (DGA), methyldiethanolamine (MDEA) and triethanolamine (TEA) in combination with one of more amines selected from the group of N,N'-di(hydroxyalkyl)piperazine, N,N,N',N'-tetrakis(hydroxyalkyl)-1,6-hexanediamine and tertiary alkylamine sulfonic acid compounds.

The $CO_2$ absorbing liquid may further comprise N-ethyldiethanolamine (EDEA) and/or piperazine, especially in combination with one of more amines selected from the group of monethanolamine (MEA), diethanolamine (DEA), diglycolamine (DGA), methyldiethanolamine (MDEA) and triethanolamine (TEA).

In another preferred embodiment, the $CO_2$ absorbing liquid comprises ammonia.

Suitably, the amount of oxygen in the third off-gas stream is very low. Oxygen can cause amine degradation and can lead to the formation of degradation products in the absorbing liquid. A lower oxygen content of the third off-gas stream will therefore result in less amine degradation and less formation of degradation products.

In the event that the third off-gas stream comprises an appreciable quantity of oxygen, suitably in the range of from 1 to 20% (v/v) of oxygen, preferably a corrosion inhibitor is added to the absorbing liquid. Suitable corrosion inhibitors are described for example in U.S. Pat. No. 6,036,888.

The purified gas obtained in step (d) comprises very little $CO_2$. Suitably, the purified gas comprises less than 0.5 vol %, preferably less than 0.1 vol % and more preferably less than 0.01 vol % of $CO_2$. The purified gas may be vented into the atmosphere of incinerated.

In most cases it will be desirable to have a continuous process, including regeneration of the $CO_2$ absorbing liquid. Thus, preferably the process further comprises the step of regenerating the $CO_2$ absorbing liquid enriched in $CO_2$ by contacting the absorbing liquid enriched in $CO_2$ with a stripping gas at elevated temperature in a regenerator to obtain regenerated absorbing liquid and a gas stream enriched in $CO_2$. It will be understood that the conditions used for regeneration depend inter alia on the type of absorbing liquid and on the conditions used in the absorption step. Suitably, regeneration takes place at a different temperature and/or different pressure than the absorption.

In the event that the $CO_2$ absorbing liquid comprises an amine, preferred regeneration temperatures are in the range of from 100 to 200° C. In the event that the $CO_2$ absorbing liquid comprises an aqueous amine, regeneration preferably takes place at pressure in the range of from 1 to 5 bara.

In the event that the $CO_2$ absorbing liquid comprises ammonia, suitably the absorbing step is performed at temperatures below ambient temperature, preferably in the range of from 0 to 10° C., more preferably from 2 to 8° C.

The regeneration step is suitably performed at temperatures higher than used in the absorption step. When using a $CO_2$ absorbing liquid comprising ammonia, the $CO_2$-enriched gas stream exiting the regenerator is at elevated pressure. Suitably, the pressure of the $CO_2$-enriched gas stream is in the range of from 5 to 8 bara, preferably from 6 to 8 bara. In applications where the $CO_2$-enriched gas stream needs to be at a high pressure, for example when it will be used for injection into a subterranean formation, it is an advantage that the $CO_2$-enriched gas stream is already at an elevated pressure. Normally, a series of compressors is needed to pressurise the $CO_2$-enriched gas stream to the desired high pressures. A $CO_2$-enriched gas stream which is already at elevated pressure is easier to further pressurise.

Preferably, the gas stream enriched in carbon dioxide is pressurised to produce a pressurised carbon dioxide stream.

Preferably, the pressurised $CO_2$ stream has a pressure in the range of from 40 to 300 bara, more preferably from 50 to 300 bara. A $CO_2$ stream having a pressure in these preferred ranges can be used for many purposes, in particular for enhanced recovery of oil, coal bed methane or for sequestration in a subterranean formation.

Especially for purposes wherein the pressurised $CO_2$ stream is injected into a subterranean formation, high pressures are required. In a preferred embodiment, the pressurised $CO_2$ stream is used for enhanced oil recovery. By injecting $CO_2$ into an oil reservoir, the oil recovery rate can be increased. Typically, the pressurised $CO_2$ stream is injected into the oil reservoir, where it will be mixed with some of the oil which is present. The mixture of $CO_2$ and oil will displace oil which cannot be displaced by traditional injections.

What is claimed is:

1. A process for removal of $H_2S$ and $CO_2$ from an acid gas stream comprising $H_2S$ and $CO_2$, wherein the process comprises the steps of:
   (a) reacting $H_2S$ in the acid gas stream with $SO_2$ to form sulphur vapour and water vapour, thereby obtaining a first off-gas stream comprising $CO_2$, water vapour, sulphur vapour, residual $SO_2$ and residual $H_2S$;
   (b) converting residual $SO_2$ in the first off-gas stream to $H_2S$ in a first off-gas treating reactor, thereby obtaining a second off-gas stream depleted in $SO_2$ and enriched in $H_2S$ and $CO_2$ compared to the first off-gas stream;
   (c) contacting the second off-gas stream with an $H_2S$ absorbing liquid, thereby transferring $H_2S$ from the gas stream to the $H_2S$ absorbing liquid to obtain an $H_2S$ absorbing liquid enriched in $H_2S$ and a third off-gas stream enriched in $CO_2$; and
   (d) removing $CO_2$ from the third off-gas stream by contacting the third off-gas stream with a $CO_2$ absorbing liquid in a $CO_2$ absorber at an operating pressure in the range 20 to 200 mbarg, thereby transferring $CO_2$ from the third off-gas stream to the $CO_2$ absorbing liquid to obtain a $CO_2$ absorbing liquid enriched in $CO_2$ and a purified gas stream comprising less than 0.5 vol % of $CO_2$.

2. The process according to claim 1, wherein the $CO_2$ absorbing liquid comprises an amine selected from the group consisting of monethanolamine (MEA), diethanolamine (DEA), diglycolamine (DGA), methyldiethanolamine (MDEA), and triethanolamine (TEA).

3. The process according to claim 1, wherein the $CO_2$ absorbing liquid comprises a combination of amines, the combination being a first amine selected from the group consisting of monethanolamine (MEA), diethanolamine (DEA), diglycolamine (DGA), methyldiethanolamine (MDEA) and triethanolamine (TEA) in combination with a second amine selected from the group consisting of N,N'-di(hydroxyalkyl)piperazine, N,N,N',N'-tetrakis(hydroxyalkyl)-1,6-hexanediamine and tertiary alkylamine sulfonic acid compounds.

4. The process according to claim 1, wherein the $CO_2$ absorbing liquid comprises either N-ethyldiethanolamine (EDEA) or piperazine, or a combination of both, in combination with an amine selected from the group consisting of monethanolamine (MEA), diethanolamine (DEA), diglycolamine (DGA), methyldiethanolamine (MDEA), and triethanolamine (TEA)

5. The process according to claim 1, wherein the $CO_2$ absorbing liquid comprises ammonia.

6. The process according to claim 1, wherein the acid gas stream is obtained by separating $H_2S$ and $CO_2$ from a sour gas.

7. The process according to claim 1, wherein the third off-gas stream enriched in $CO_2$ comprises at least 5 vol % of $CO_2$, based on the total of the third off-gas stream enriched in $CO_2$.

8. The process according to claim 1, wherein step (d) takes place at an operating pressure in the range 50 to 150 mbarg.

9. The process according to claim 1, wherein the $CO_2$ absorbing liquid comprises monethanolamine (MEA).

10. The process according to claim 1, wherein step (a) takes place in a Claus unit.

11. The process according to claim 1, wherein the acid gas stream comprises from 5 to 95 vol % $H_2S$ and at least 5 vol % $CO_2$.

12. The process according to claim 1, wherein the third off-gas stream enriched in $CO_2$ comprises at least 1 vol % of $CO_2$, based on the total of the third off-gas stream enriched in $CO_2$.

13. The process according to claim 12, wherein the third off-gas stream enriched in $CO_2$ comprises at least 10 vol % of $CO_2$, based on the total of the third off-gas stream enriched in $CO_2$.

14. The process according to claim 1, wherein the second off-gas stream is cooled to a temperature in the range from 6 to 60° C. prior to being contacted with the $H_2S$ absorbing liquid.

15. The process according to claim 14, wherein the second off-gas stream comprises less than 200 ppmv $H_2S$ based on the total second off-gas stream.

16. The process according to claim 1, wherein the process further comprises the step of:

regenerating the absorbing liquid enriched in $CO_2$ by contacting the absorbing liquid enriched in $CO_2$ with a stripping gas at elevated temperature in a regenerator to obtain a regenerated absorbing liquid and a gas stream enriched in $CO_2$.

17. The process according to claim 16, the process further comprising the step of:

pressurising the gas stream enriched in $CO_2$.

18. A process for removal of $H_2S$ and $CO_2$ from an acid gas stream comprising $H_2S$ and $CO_2$, wherein the process comprises the steps of:

(a) reacting $H_2S$ in the acid gas stream with $SO_2$ to form sulphur vapour and water vapour, thereby obtaining a first off-gas stream comprising $CO_2$, water vapour, sulphur vapour, residual $SO_2$ and residual $H_2S$;

(b) converting residual $SO_2$ in the first off-gas stream to $H_2S$ in a first off-gas treating reactor, thereby obtaining a second off-gas stream depleted in $SO_2$ and enriched in $H_2S$ and $CO_2$ compared to the first off-gas stream;

(c) contacting the second off-gas stream with an $H_2S$ absorbing liquid, thereby transferring $H_2S$ from the gas stream to the $H_2S$ absorbing liquid to obtain an $H_2S$ absorbing liquid enriched in $H_2S$ and a third off-gas stream enriched in $CO_2$; and (d) removing $CO_2$ from the third off-gas stream by contacting the third off-gas stream with a $CO_2$ absorbing liquid, comprising an amine selected from the group consisting of monethanolamine (MEA), diethanolamine (DEA), diglycolamine (DGA), methyldiethanolamine (MDEA), and triethanolamine (TEA), in a $CO_2$ absorber at an operating pressure in the range 20 to 200 mbarg, thereby transferring $CO_2$ from the third off-gas stream to the $CO_2$ absorbing liquid to obtain a $CO_2$ absorbing liquid enriched in $CO_2$ and a purified gas stream comprising less than 0.5 vol % of $CO_2$.

19. The process according to claim 18, wherein step (d) takes place at an operating pressure in the range 50 to 150 mbarg.

20. The process according to claim 19, wherein the third off-gas stream enriched in $CO_2$ comprises at least 20 vol % of $CO_2$, based on the total of the third off-gas stream enriched in $CO_2$.

* * * * *